Figure 3:
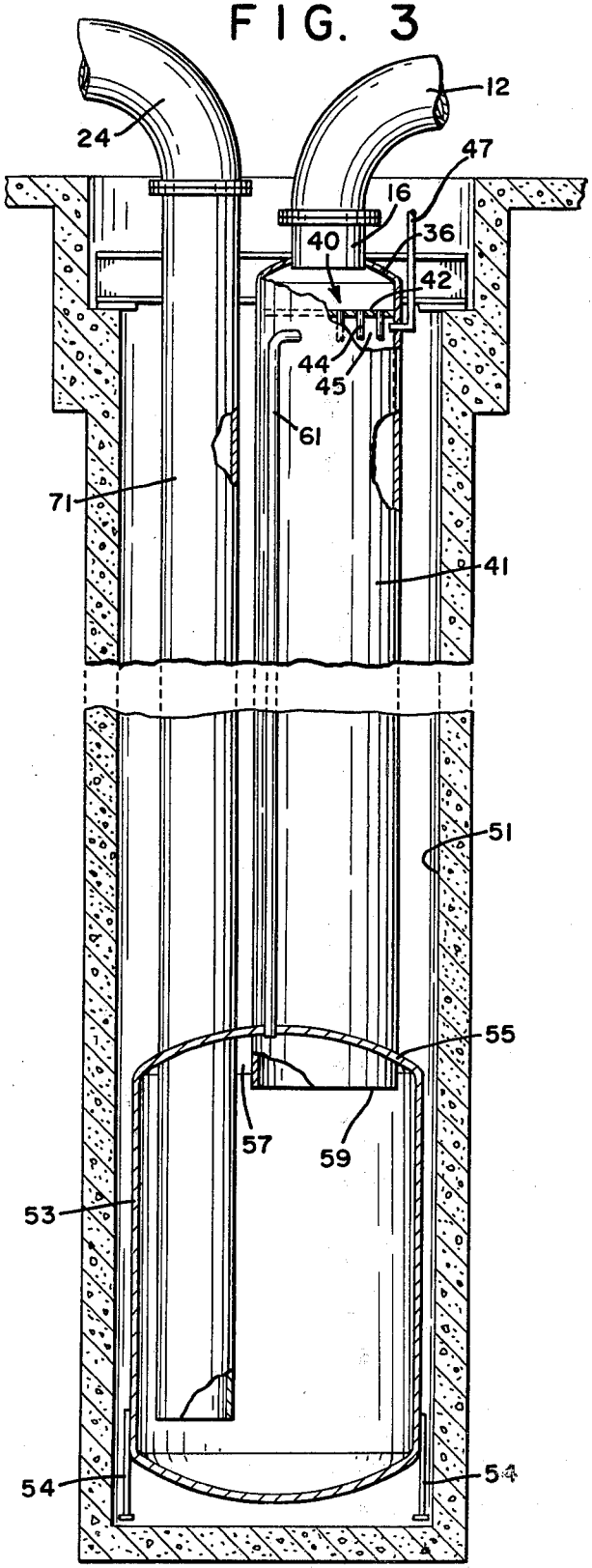

United States Patent [19]

Kos

[11] Patent Number: 4,466,928

[45] Date of Patent: Aug. 21, 1984

[54] APPARATUS FOR DISSOLUTION OF GASES IN LIQUID

[75] Inventor: Peter Kos, Ridgefield, Conn.

[73] Assignee: Dorr-Oliver Incorporated, Stamford, Conn.

[21] Appl. No.: 402,410

[22] Filed: Jul. 27, 1982

Related U.S. Application Data

[63] Continuation-in-part of Ser. No. 938,130, Aug. 30, 1978, abandoned.

[51] Int. Cl.³ .............................................. B01F 3/04
[52] U.S. Cl. ..................................... 261/76; 210/170; 210/221.2; 261/123; 261/DIG. 27; 261/DIG. 75
[58] Field of Search ................... 261/36 R, 77, 76, 93, 261/123, 126, DIG. 27, DIG. 7, DIG. 75; 210/170, 219, 220, 221.2, 620, 758; 209/170; 435/313; 422/228

[56] References Cited

U.S. PATENT DOCUMENTS

| | | | |
|---|---|---|---|
| 543,411 | 7/1895 | Taylor | 261/DIG. 75 |
| 2,633,344 | 3/1953 | Rekk | 261/76 |
| 3,643,403 | 2/1972 | Speece | 261/93 X |
| 3,662,890 | 5/1972 | Grimshaw | 261/DIG. 75 |
| 3,761,065 | 9/1973 | Rich et al. | 261/76 |
| 3,826,742 | 7/1974 | Kirk et al. | 261/DIG. 75 |
| 3,840,216 | 10/1974 | Smith et al. | 261/DIG. 75 |
| 4,000,227 | 12/1976 | Garrett | 261/93 |
| 4,043,771 | 8/1977 | Anand | 261/DIG. 75 |
| 4,060,574 | 11/1977 | Verner et al. | 261/123 X |

OTHER PUBLICATIONS

ICI, "The ICI Deep Shaft Effluent Treatment Process", ICI Limited, Cleveland, Sep., 1965.

Primary Examiner—Richard L. Chiesa
Attorney, Agent, or Firm—Harold M. Snyder; Burtsell J. Kearns

[57] ABSTRACT

A treatment system for liquids includes apparatus for dissolving gas in the liquid and a container for providing the necessary reaction time between the gas and liquid or constituents thereof. The device for dissolving the gas in the liquid includes gas injection means for introducing gas into the liquid and a contact chamber for containing a downflowing stream of the liquid to be treated. The pressure within the downflowing stream increases as it descends and at the elevated pressure the capacity of the liquid to take gas into solution is greatly increased. This apparatus for dissolving gas may conveniently be located below ground level. A conduit return means is provided for routing undissolved gas from a region at high pressure to an upstream portion of the liquid stream so that the gas can be reintroduced for dissolution.

3 Claims, 8 Drawing Figures

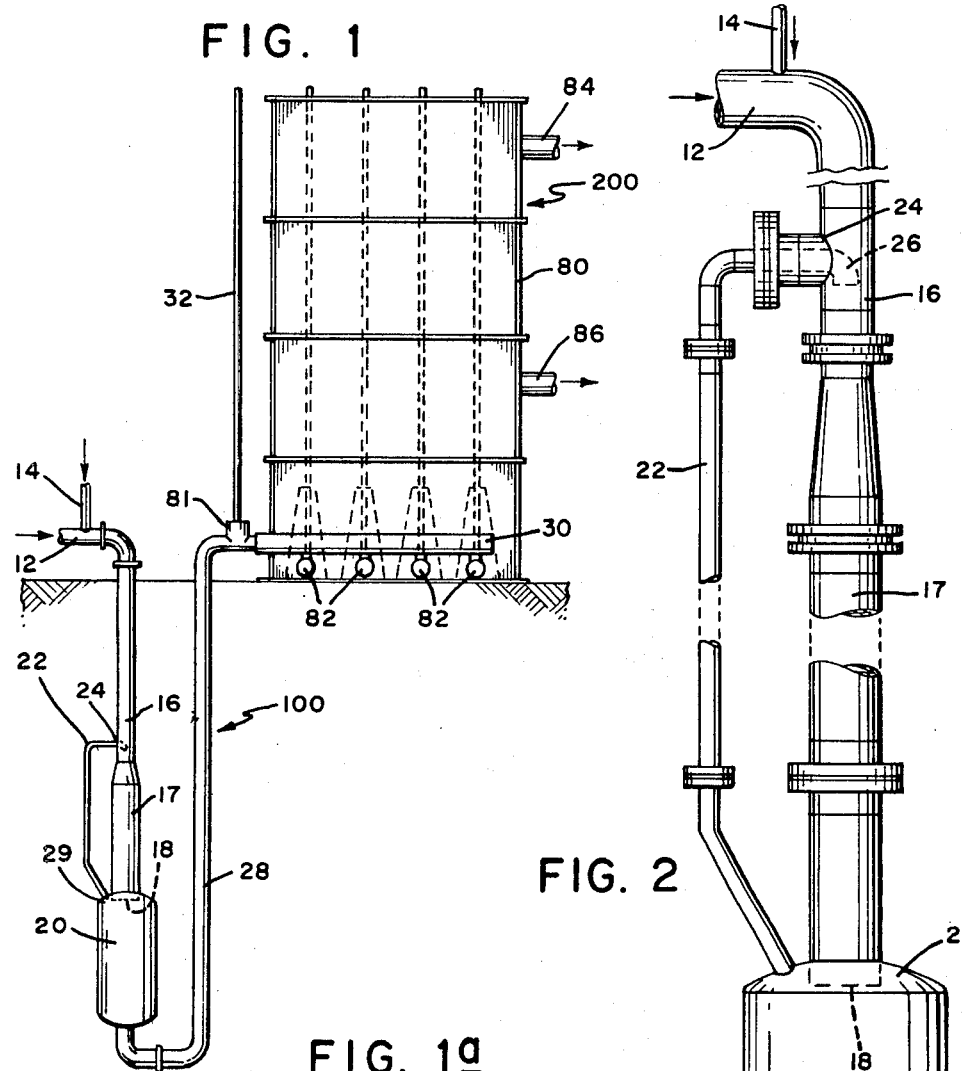
FIG. 1
FIG. 2
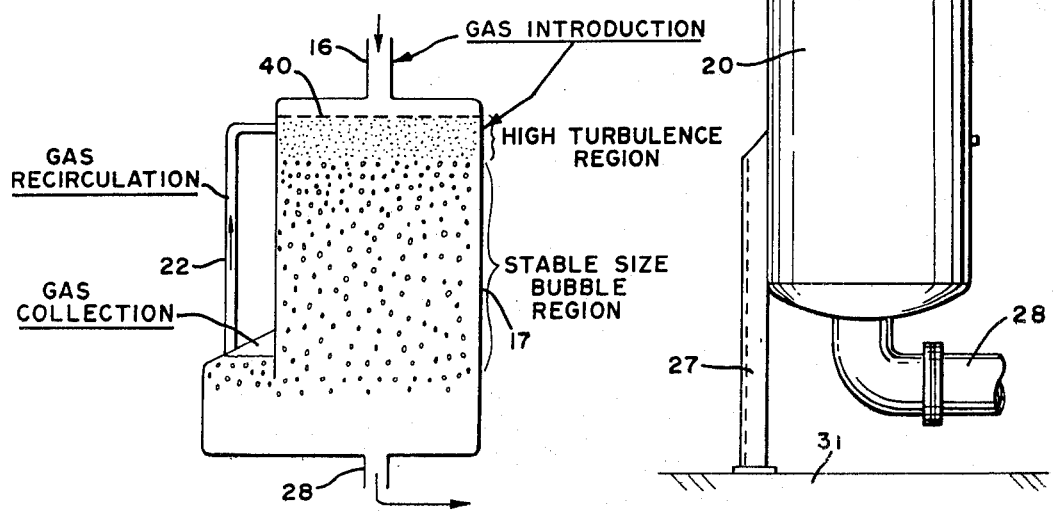
FIG. 1a

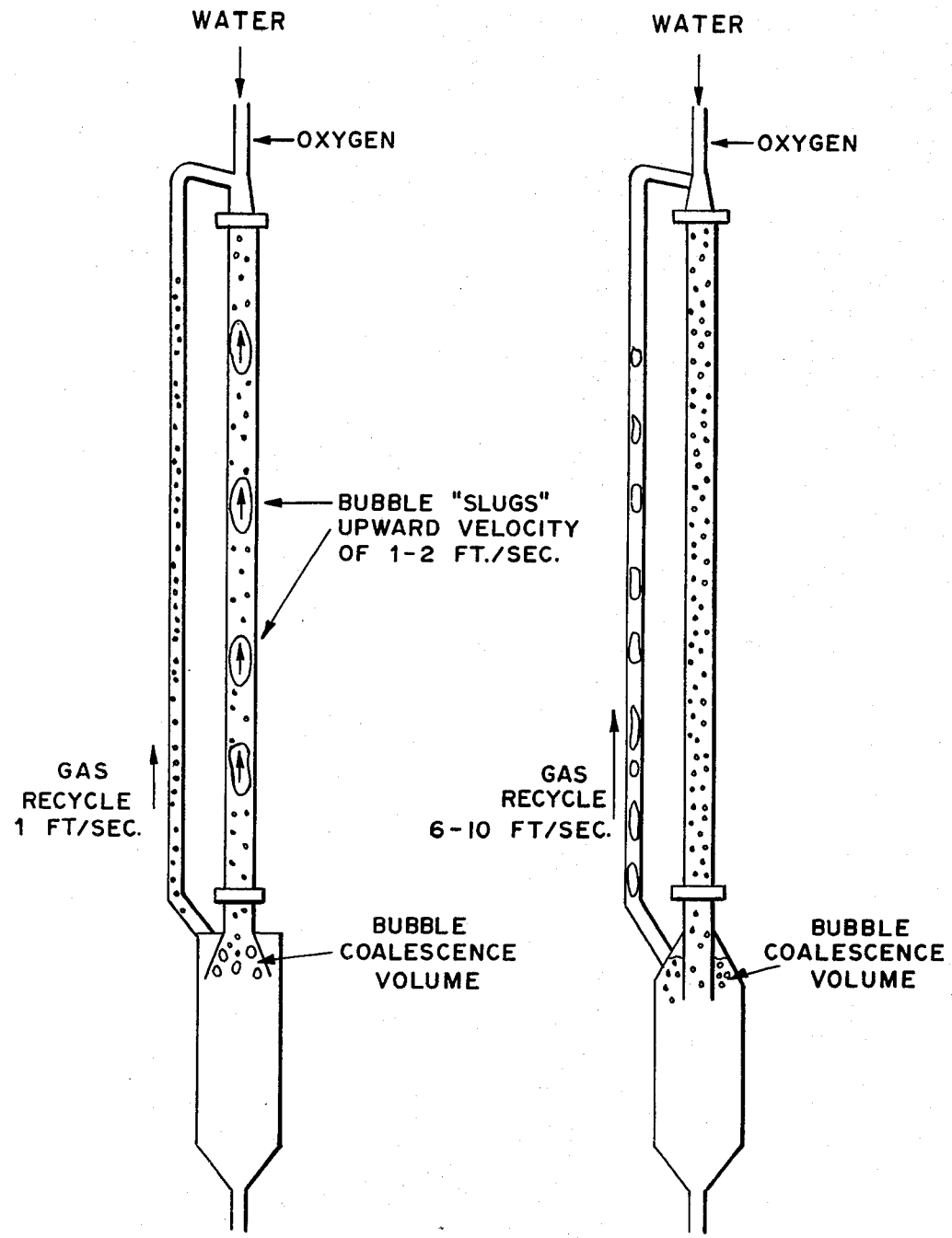

APPARATUS FOR DISSOLUTION OF GASES IN LIQUID

This application is a continuation-in-part of application Ser. No. 938,130 filed Aug. 30, 1978 and now abandoned.

This invention is directed to a system for dissolving gas in liquid wherein the gas may be oxygen-containing and the liquid may have an oxygen demand.

In many processes it is desirable to dissolve gases in liquids. Such processes include the dissolution of carbon dioxide in water in the carbonation of water, the dissolution of oxygen in water in water treatment technology or in waste water treatment and in certain fermentation processes. Very often the system for dissolving gas in liquid involves very severe agitation of the liquid-gas mixture to break up the gas bubbles into very fine bubbles which present a large surface area to the liquid, thereby promoting solution of gas in the liquid. Alternatively, the liquid may be sprayed in fine droplets through the gas so that, with the large surface area presented by the droplets, substantial amounts of gas are dissolved in the liquid. Oxygenation of water has been accomplished in several ways including spray aeration, in which water is sprayed into the air in fine droplets and the fine droplets dissolve oxygen as they pass through the air; cascade aeration, in which a water stream is arranged so that a series of falls are provided in a conduit, each fall increasing exposure of the water to the air; multi-tray aeration, in which the water drops onto a series of trays picking up oxygen during its fall to the trays; diffused aeration in which air under pressure is bubbled through a volume of water in which the air bubbles have extended exposure to the water for solution purposes; and lastly, U-tube aeration in which an air-water mixture is passed down under a baffle which may extend 50 feet or more below the surface of the ground to pressurize the mixture and then returning the mixture to the surface.

Where oxygen is to be dissolved in water it is clear that the use of pure oxygen rather than air will permit either a reduction in size of various elements of the apparatus used in the process or, alternatively, a great increase in the productivity of units sized for the use of air, since air is only 1/5 oxygen. However, in contrast to air, pure oxygen is quite expensive and care must be taken to avoid wastage of the oxygen gas.

A novel structure has now been provided in which large amounts of gas may be rapidly dissolved in liquids.

It is the object of this invention to provide a relatively simple but highly efficient apparatus for dissolving gas in liquid.

Figure 6:
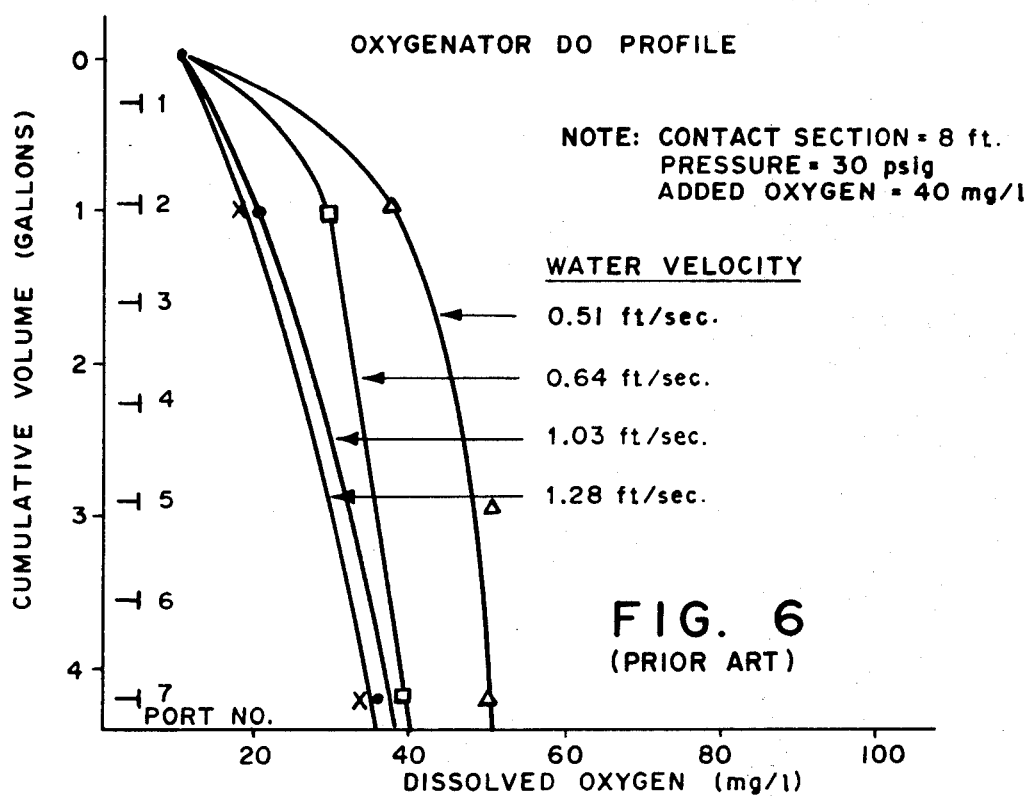
Figure 7:
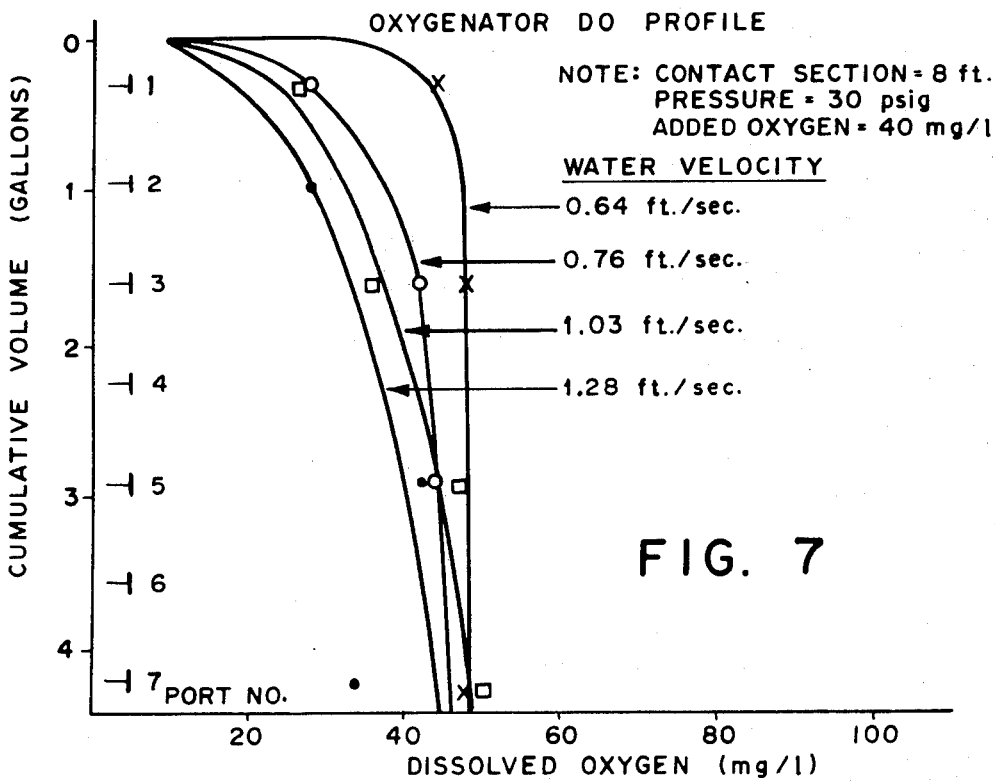

Other objects and advantages will become apparent from the following description taken in conjunction with the accompanying drawing in which:

FIG. 1 is a view in elevation of a treatment system which includes a fluid bed reactor and an apparatus for dissolving gas in liquid, FIG. 1a is a schematic view of an apparatus illustrative of certain of the principal features of the invention, FIG. 2 is a view in elevation showing the apparatus for dissolving gas in liquid in larger scale, FIG. 3 is a view in elevation and partially in section of a modified form of the apparatus for dissolving gas in liquid, FIG. 4 is a sectional view of a device incorporating a prior art concept, FIG. 5 is a section view of a device similar to that of FIG. 4 but incorporating the concepts of the present invention, FIG. 6 is a graph of the oxygen dissolution performance of the device of FIG. 4, and FIG. 7 is a graph similar to that of FIG. 6 showing the oxygen dissolution performance of the device of the present invention.

Generally speaking, the apparatus for continuously dissolving gas in liquid in accordance with this invention involves a means for bringing the gas into contact with a stream of liquid, means for pressurizing the liquid while in contact with the gas to the pressure necessary to dissolve the required amount of gas, means for collecting undissolved gas in the pressurized zone and means for returning the collected gas to an upstream portion of the liquid stream for reintroduction of the gas into the liquid. The gas which is to be dissolved in the liquid is quite often oxygen, in which case the apparatus for dissolving gas in liquid may be termed an "oxygenator", and the liquid may be the effluent from the primary treatment stage of a sewage plant or other liquid flow.

In order to obtain the desired pressure, it is often quite convenient to install the oxygenator below ground level at a depth such that the hydrostatic pressure of the column of liquid is sufficient to provide the desired pressure for gas dissolution. The oxygenator may be a self-contained unit which is simply lowered into an excavated pit to the desired depth with no particular significance attached to whether or not the pit is water tight or, the apparatus may be designed to utilize the pit wall to contain either the inlet or the outlet flow in which case the pit wall must be water tight.

As an illustration of certain of the principles involved in the present invention, reference is made to FIG. 1a, in which an apparatus comprising a contact chamber 17 having an inlet pipe 16 and an outlet pipe 28, is provided with a flow distributor 40 and a gas recycle line 22.

Liquid enters into the contact chamber 17 through the inlet 16 and the flow distributor 40. Gas is introduced into the contact chamber 17, preferably below the distributor 40, or into the liquid stream above the distributor. The purpose of the distributor is threefold: (a) to distribute the incoming liquid uniformly through the whole horizontal cross section of the contact chamber, (b) to introduce liquid with velocity sufficient to break larger gas bubbles into smaller ones, and (c) to introduce liquid into the contact chamber with velocity greater than the rising velocity of gas bubbles in the chamber in order to prevent gas escaping from the contact chamber into the inlet pipe.

It has been determined that, in case of oxygen dissolution in water, the entrance velocity of the liquid may be in the range from 1 to 10 ft./sec.

Any large gas bubbles present under the distributor as a result of gas feeding or gas recirculation are sheared by the entering liquid into smaller ones, and the small bubbles are swept downward by the stream of liquid. The size of these bubbles is determined by the balance between surface-tension forces and liquid stress (turbulence). The greater the velocity of the incoming liquid the greater the turbulence below the distributor and smaller the size of the bubbles. The bubbles swept away from the distributor (into the region not affected by the turbulence of the incoming liquid) tend to coalesce as they touch each other until they reach the maximum stable size for the prevailing shear field in the contact chamber. When relatively low entrance velocities are used (1-5 ft./sec.), the turbulent region does not extend beyond more than about two feet below the distributor. Outside the turbulent region, below the distributor, bubbles of uniform size predominate; that is, bubbles of maximum stable size. The turbulent region and the region of stable bubble size are indicated by appropriate legends in FIG. 1a.

The downward velocity of the liquid in the contact chamber must be greater than the rising velocity of the maximum stable sized bubbles, thus causing a continuous downward flow of bubbles carried by the liquid. For a very broad range of bubble sizes (from 0.06 cm. to about 2 cm.), the rising velocity of bubbles is nearly constant; between 20 to 35 cm/sec. (0.66 to 1.2 ft./sec.). When more than one bubble is present in liquid the rising velocity is lower. For the oxygen-water system, with oxygen occupying about 30% of liquid volume, the average rising velocity of bubbles is found to be approximately 0.5 ft./sec. When the difference between the downward velocity of liquid and rising velocity of stable bubbles is small, then a relatively high concentration of bubbles in the contact chamber is obtained and bubbles remain for a longer time in the contact chamber before they are swept down to the lower end of the contact chamber. It is well known that the rate of the dissolution is directly proportional to the interfacial area (area of the bubble surface), thus the greater the concentration of bubbles the greater the rate of the dissolution.

In the present invention, the velocity of liquid is 0.5 ft./sec., or higher, causing all sizes of bubbles from the range (0.6 cm. to 2.0 cm.) to travel slowly downward from the flow distributor where they are created by the incoming streams of liquid and gas. Because of the coalescence of the bubbles the so-called equilibrium bubble size is established within approximately 2 ft. below the flow distributor (most bubbles have a diameter close to the equilibrium size; which is about 1.0 cm. for oxygen-water systems). Due to the fact that most of the bubbles present in the contact chamber have about the same rising velocity, and this velocity is equal or slightly lower than the downward velocity of liquid, an extremely high concentration of bubbles can be present in the contact chamber. Bubbles are very slowly moving down and their concentration is higher as the difference between the rising velocities of bubbles and downward velocity of liquid decreases. Because the bubbles generated under the flow distributor are constantly washed down by the liquid, and because the bubbles maintain their diameter close to the equilibrium size, it is possible to have a column of nearly constant size bubbles as long as you wish; say 5, 10 or 50 ft. long. This allows one to build the gas dissolution chamber as long as needed for dissolution of the particular gas.

In order to further increase the concentration of bubbles in the contact chamber (and so further increase the rate of dissolution) and to attain high utilization of the gas, the bubbles which reach the bottom portion of the contact chamber are collected in a bubble collector and recirculated to the top of the contact chamber. The bubble collector may comprise a horizontal or inclined surface for intercepting and retaining rising bubbles, but other gas-liquid separation means may be used. The collected gas then flows through the gas recirculation pipe conduit 22 and discharges under the flow distributor 40. This gas recirculation does not require any external pumping. Gas flows by itself due to the difference in the densities of the gas-liquid mixture in the contact chamber and in the recycle pipe. Nevertheless, the forced recirculation of gases (by pump or by venturi) could be beneficial in some applications.

In the apparatus just described, a very high gas utilization, approaching 100%, can be achieved and the high rate of dissolution permits the use of equipment of modest size. These advantages are due to the special hydraulic conditions established at the top of the contact chamber, in the chamber itself and by gas recirculation whereby a very large gas-liquid interfacial area is realized by establishing a high concentration of stable size bubbles. An energy saving is effected by relying primarily on the high concentration of stable size bubbles for dissolution of the gas rather than expending large amounts of energy to generate extremely small, unstable bubbles for the gas dissolution process.

Considering FIG. 1, there is illustrated a liquid-treatment system comprising an apparatus 100 for dissolving gas in liquid which delivers liquid containing large amounts of dissolved gas to a reactor 200. The reactor 200 illustrated is a fluid bed reactor in which the oxygen enriched waste water is introduced at the bottom thereof and the liquid passes through the reactor, the retention time of the liquid in the reactor being such as to obtain the desired degree of reaction. For the purposes of this discussion, we may consider the system illustrated in FIG. 1 a biological treatment system for waste water, wherein the apparatus for dissolving gas in liquid is an oxygenator and the fluid bed reactor contains a sand bed therein on the particles of which biological growth proceeds supported by the nutrients in the feed and the dissolved oxygen provided by the oxygenator.

The feed to the system enters through inlet pipe 12 while pure oxygen is introduced through conduit 14. The waste water-oxygen mixture proceeds below ground level through downcomer 16 then enters contact chamber 17 and emerges from outlet 18 into the bubble disengagement chamber 20. A return oxygen conduit 22 connects the upper end of the bubble collector 20, where the gas is trapped, with the contact chamber 17 at an upstream junction 24. An outlet conduit 28 connects the lower end of bubble disengagement chamber 20 with the manifold 30 of the fluid bed reactor 200. The manifold 30 may be provided with a bubble collector 81 and a vent pipe 32 which will either release to the atmosphere or to a gas collection tank any undissolved oxygen which reaches the manifold. The structure and operation of the fluid bed reactor is described in detail in my U.S. application Ser. No. 909,076, filed May 24, 1978 now matured into U.S. Pat. No. 4,202,774 which issued on May 13, 1980. Briefly it should be noted that the oxygen-containing liquid is supplied from the manifold 30 to a plurality of inlet pipes 82 which admit the waste water into the reactor tank 80 and that the treated effluent exits the reactor tank through conduit 84. A sand bed is provided in the reactor tank 80 which is fluidized by the upflowing liquid stream and on the particles of which biological growth occurs. A portion of the sand is removed continuously or batchwise through conduit 86 for removal of biological growth from the sand and disposal thereof after which the sand can be returned to the tank 80.

The gas dissolution feature of this invention relies in large part on the phenomenon that as the pressure is increased on a gas-liquid mixture the amount of gas that goes into solution is increased. The pressure on a gas-liquid mixture may be increased, for example, by pumping the mixture into the gas-liquid contact device while regulating the pressure therein by adjustment of a choke valve located at the exit from the device. In the present invention, it is preferred to obtain the required pressure by providing a contact chamber which is subject to a column of water of height sufficient to develop the necessary hydrostatic pressure. A simple way to accomplish this end is to provide, in a pit excavated to the depth necessary to develop the pressure, a conduit filled with the liquid extending from an above ground level down to a contact chamber. In this manner, a column of say, 60 feet of water, will generate a pressure of about 40.7 lbs. per sq. in. (absolute), a pressure at which water, at ambient temperature, can dissolve several times the amount of oxygen it is capable of dissolving at atmospheric pressure. In the contact chamber, a great amount of oxygen goes into solution, and a high concentration of stable size bubbles is present.

An outlet conduit is provided connected to the disengagement chamber for returning treated liquid to ground level. Since the liquid is saturated, or very nearly saturated, with gas as it moves from the disengagement chamber to ground level, and since the pressure on the liquid as it rises is continuously decreasing, a certain amount of the gas can be expected to come out of solution. For that reason, the vent line 32, connected to disengagement chamber 81, is provided at ground level in the outlet pipe 28 so that operation of the fluid bed reactor 200 is not adversely affected by the introduction of larger bubbles.

It should be noted that the pressurization is accomplished, as described above, without expenditure of large amounts of energy. This is true because the below ground portion of the apparatus is filled with liquid by gravity and only power sufficient to overcome the flow resistance of the apparatus and maintain the desired flow rate is required.

FIG. 2 illustrates the gas dissolving apparatus or oxygenator of FIG. 1 in somewhat greater detail at larger scale. In this rendition of the apparatus it should be noted that the end 18 of the contact chamber 16 projects into the bubble disengagement chamber 20 to a substantial extent. This projection of the end 18 into the chamber 20 leaves a gas trap 29 above the end 18 of the contact chamber 16 and below the top of the chamber 20. The recycle line 22 provides communication between the gas trap 29 and the nozzle 26 located at the upstream junction 24 in the contact chamber 16. The nozzle 26 cooperates with the wall of conduit 16 to form a narrowed annular passage or distributor for the liquid moving in conduit 16. This narrowed channel imparts a high velocity to the liquid which will prevent upward movement of gas bubbles and, together with transition conduit 15, tends to uniformly distribute the gas-liquid mixture on the cross-section of contact chamber 16 below nozzle 26. An outlet conduit 28 is connected to the bottom of bubble disengagement chamber 20. The apparatus 100 is supported by at least one bracket 27 fixed to a surface 31 and connected to the exterior of chamber 20.

In FIG. 3 an apparatus is shown which is similar in concept to that described in FIG. 2 but intended for use where larger flows must be accommodated. Thus, the inlet conduit 12 is connected to the downcomer 16. The downcomer 16 is directly connected to the contact chamber 41 through the upper end wall 36 of the contact chamber. The contact chamber 41 has, proximate the upper end thereof, a distributor 40 comprising a flat plate 42 pierced by a plurality of nozzles 44. The space between the lower ends of downwardly depending nozzles 44 and the underside of plate 42 forms an upper gas trap 45. An oxygen conduit 47 is provided for feeding oxygen into upper gas trap 45 from a source not illustrated.

The contact chamber 41 extends downward in pit 51 to junction with the enclosed bubble disengagement chamber 53. Chamber 53 may be provided with brackets 54 which support chamber 53 on bottom of pit 51. The contact chamber 41 is open at the bottom 59 thereof and it extends a predetermined short distance through the upper wall 55 of chamber 53. By so extending into chamber 53 as described, a lower gas trap 57 is provided between the bottom end 59 of chamber 41 and the upper wall 55 of chamber 53. A gas recycle conduit 61 extends, externally to contact chamber 41, providing communication between lower gas trap 57 and upper gas trap 45. Outlet riser 71 also penetrates the upper wall 55 of chamber 53. Riser 71 is connected at the upper end thereof to outlet conduit 24.

In operation, the incoming flow through inlet conduit 12 and downcomer 16 enters the contact chamber 41 at the upper end thereof and is distributed relatively uniformly over the whole cross-section of the contact chamber 41 by the distributor 40. Bubbles of oxygen which survive travel to the bottom of the contact chamber 41 enter the bubble disengagement chamber 53. The decreased velocity of the liquid as it moves into the disengagement chamber 53 with its greater cross-sectional area permits the remaining bubbles in the liquid to rise against the down-flowing liquid current. The rising bubbles accumulate in lower gas trap 57 above the open bottom end 59 of chamber 41. The gas in gas trap 57 moves upward through gas recycle line 61 for injection into the upper gas trap 45. The difference in density between the liquid-rich column in contact chamber 41 and the gas-rich column in the recycle line 61, is the driving force for this upward movement of gas.

The treated liquid, separated from the entrained gas bubbles, moves downward in bubble disengagement chamber 53 to enter outlet riser 71 at the lower end 73 thereof. From riser 71 the treated liquid flows into outlet conduit 24 for employment in other processes or as a final product.

In U.S. Pat. No. 4,000,227, issued Dec. 28, 1976, for "Dissolving Gas in Liquid" by M. E. Garrett, there is disclosed a device having certain points of similarity with the device of the present invention. However, the Garrett patent requires that a downward-facing divergent conduit be provided through which a gas/liquid mixture is passed to dissolve the gas in the liquid. It has been demonstrated that a device of the Garrett type, incorporating a downward facing divergent conduit, is a substantially inferior performer as a means for effecting dissolution of gas in liquid in comparison to the device of the present invention. The devices used in this demonstration are shown in FIGS. 4 and 5; FIG. 4 showing a device having a downward facing divergent conduit while FIG. 5 shows a conduit of constant cross-section as disclosed in the present invention. Test ports were provided along the length of the vertical conduit to measure dissolved oxygen. Test port 1 is near the inlet of the vertical column and test port 7 is near the bottom of that column. The two forms of the gas dissolution device have significantly different bubble and water flow patterns due to the effects of externally and internally recirculated gas. In general, the patterns inherent in the device of FIG. 4 can be characterized as extremely turbulent due to the large bubble "slugs" rushing upward through the contact column. These bubbles are most obvious at higher water velocities of 0.76–1.28 ft./sec. The small bubble diameters are fairly uniform, perhaps from 4–5 mm. Coalescence of the down-flowing bubbles takes place in the conical expanded section due to reduced water velocity and increased local bubble number density. Very few bubbles pass around the cone to be recycled up the gas recycle line. In contrast, the device of FIG. 5 allows the bubble coalescence to take place *outside* the cylindrical contact column, and be externally recirculated. The contact column has uniformly sized bubbles of about 4–5 mm diameter throughout its length, and a high volume of gas is recycled externally. The visible turbulence in the contact column is minimal, and the small bubble velocity is uniform through the column length.

As a result of these two different bubble and water flow patterns, the process of dissolution of oxygen is different in the two devices. The incline plate of Garrett's cone causes coalescence of gas bubbles into large slugs of gas which then rush through the column and disturb the flow of liquid and bubbles, causing longitudinal mixing of mixture in the columns, and reducing the rate of gas dissolution. FIGS. 6 and 7 demonstrate the slower rate of gas dissolution characterizing the device of FIG. 4. The dissolved oxygen profiles of the device of FIG. 5 as illustrated in FIG. 6 have a very evident exponential form for water velocities from 0.64 to 1.28 ft./sec. and at 40 and 60 mg/l added oxygen. The profiles for the device of FIG. 4 as shown in FIG. 7 are much more linear from 0.64 to 1.27 ft./sec., and do not show an obvious exponential shape due to this longitudinal mixing. Stated another way, a saturated condition (oxygen in water) is approached more rapidly in the device of FIG. 5; that is the device of the present invention.

It is envisioned that the inventive processes and apparatus set forth herein may also be applied to the dissolution of other gases in liquid streams other than waste or other streams which have an oxygen deficiency or otherwise require treatment with oxygen.

While the present invention has been particularly described in terms of specific embodiments thereof, it will be understood in view of the instant disclosure that numerous variations upon the invention will now be evident to those skilled in the art, which variations are yet within the scope of the instant teaching.

I claim:

1. Apparatus for dissolving gas in a liquid comprising, an inlet conduit for introducing a liquid stream into said apparatus, a contact chamber arranged to receive said liquid stream from said inlet conduit, means for injecting a gas into said apparatus to produce a mixed gas-liquid stream means for maintaining the mixed gas-liquid stream in said contact chamber at elevated pressure, a flow distributor proximate the upper end of said contact chamber comprising a constriction plate extending across the diameter of said contact chamber, said constriction plate having a plurality of nozzles fixed thereto all extending in a downstream direction forming an upper gas trap between said constriction plate and the downstream ends of said nozzles, said contact chamber being of essentially uniform cross-section so that a substantially constant velocity of said mixed gas-liquid stream may be maintained therein, a gas disengagement chamber at the lower end of said contact chamber and having a substantially larger diameter than said contact chamber, the open lower end of said contact chamber penetrating the upper wall of said disengagement chamber and extending into the latter chamber a predetermined distance thereby forming a lower gas trap between the open lower end of said contact chamber and the aforesaid upper wall, a recycle conduit external to said contact chamber connecting said lower gas trap in said disengagement chamber to said upper gas trap so that said gas in said lower gas trap is injected into said upper gas trap by the differential pressure therebetween for further dissolution in said liquid, and an outlet to permit the treated liquid to exit said gas disengagement chamber, wherein said outlet penetrates the upper wall of said disengagement chamber and extends into said disengagement chamber to a point proximate to bottom thereof and said means for injecting a gas into said apparatus is a conduit in flow communication with the upper end of said contact chamber.

2. Apparatus for dissolving gas in a liquid comprising, an inlet conduit for introducing a liquid stream into said apparatus, a contact chamber arranged to receive said liquid stream from said inlet conduit, means for injecting a gas into said apparatus to produce a mixed gas-liquid stream, the mixed gas-liquid stream substantially filling said contact chamber, means for maintaining the mixed gas-liquid stream in said contact chamber at an elevated pressure, a static flow distributor comprising a constriction plate extending across the diameter of said contact chamber proximate the upper end of said contact chamber to assure that a uniform velocity of flow is achieved as measured along a cross-section of the flow stream in said chamber, said constriction plate having a plurality of nozzles affixed thereto and extending in a downstream direction thereby forming an upper gas trap between said constriction plate and the downstream ends of said nozzles, said contact chamber being of essentially uniform cross-section so that a substantially constant velocity of said mixed gas-liquid stream may be maintained therein, an enclosed bubble disengagement chamber located at the lower end of said contact chamber having a substantially larger diameter than said contact chamber, the open lower end of said contact chamber extending through the upper end wall of said disengagement chamber and into the latter chamber a predetermined distance thereby forming a lower gas trap between said upper end wall and the lower end of said contact chamber, a gas recycle conduit external to said contact chamber connecting said lower gas trap to said upper gas trap so that gas accumulated in said lower gas trap is injected into said upper gas trap by the differential pressure therebetween for further dissolution in said liquid, and an outlet conduit communicating with said enclosed bubble disengagement chamber to permit the treated liquid therein to exit said disengagement chamber, wherein said outlet penetrates the upper wall of said disengagement chamber and extends into the disengagement chamber to a point proximate the bottom thereof and said means for injecting a gas into said apparatus is a conduit in flow communication with the upper end of said contact chamber.

3. The apparatus of claims 1 or 2 wherein said means for injecting a gas into said apparatus is an oxygen line.

* * * * *